US008310599B2

(12) United States Patent
Hashimoto

(10) Patent No.: US 8,310,599 B2
(45) Date of Patent: Nov. 13, 2012

(54) TELEVISION SET

(75) Inventor: Yoshiharu Hashimoto, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 1119 days.

(21) Appl. No.: 12/222,219

(22) Filed: Aug. 5, 2008

(65) Prior Publication Data

US 2009/0185082 A1 Jul. 23, 2009

(30) Foreign Application Priority Data

Aug. 8, 2007 (JP) ................................ 2007-206989

(51) Int. Cl.
*H04N 5/268* (2006.01)

(52) U.S. Cl. ........ 348/705; 348/706; 348/739; 348/792; 348/555; 348/558

(58) Field of Classification Search .................. 348/705, 348/706, 792, 555, 558, 739
See application file for complete search history.

(56) References Cited

U.S. PATENT DOCUMENTS 6,515,647 B1 * 2/2003 Sakamoto ....................... 345/99
7,176,870 B2 * 2/2007 Sakamaki et al. .............. 345/98
2001/0024187 A1 * 9/2001 Sato et al. ....................... 345/98
2002/0097208 A1 * 7/2002 Hashimoto ..................... 345/87
2004/0263688 A1 * 12/2004 Mutoh .......................... 348/558
2005/0068282 A1 * 3/2005 Mizumaki ....................... 345/89
2005/0122305 A1 * 6/2005 Murao et al. .................. 345/101
2005/0134544 A1 6/2005 Igarashi et al.
2006/0022929 A1 * 2/2006 Hashimoto et al. ............. 345/96
2006/0044251 A1 * 3/2006 Kato et al. ....................... 345/98
2006/0114220 A1 * 6/2006 Wang ............................ 345/103
2006/0197870 A1 * 9/2006 Habas et al. .................. 348/565
2007/0046658 A1 * 3/2007 Sakamaki et al. ............ 345/204
2007/0085794 A1 * 4/2007 Kawabe et al. ................. 345/89
2007/0097061 A1 * 5/2007 Kurita ............................. 345/99
2007/0182675 A1 * 8/2007 Yamazaki et al. .............. 345/76
2007/0223879 A1 * 9/2007 Ito et al. .......................... 386/95
2007/0296656 A1 * 12/2007 Lin ................................. 345/87
2009/0278869 A1 11/2009 Oishi et al.

FOREIGN PATENT DOCUMENTS

JP H07-230264 (A) 8/1995
JP H09-105912 (A) 4/1997
JP H10-304287 (A) 11/1998

(Continued)

OTHER PUBLICATIONS

Japanese Notification of Reason for Refusal dated May 16, 2012, with partial English-language translation.

*Primary Examiner* — Pankaj Kumar
*Assistant Examiner* — Mulugeta Mengesha
(74) *Attorney, Agent, or Firm* — McGinn IP Law Group, PLLC

(57) ABSTRACT

A television set includes a television set body section which has a display panel in which pixels are arranged at intersections of scan lines and data lines in a matrix; and first and second input terminals provided for the television set body section. A first video signal is displayed on the display panel in a first drive system when the first video signal supplied to the first input terminal is selected. A second video signal is displayed on the display panel in a second drive system when the second video signal supplied to the second input terminal is selected.

20 Claims, 15 Drawing Sheets

FOREIGN PATENT DOCUMENTS

| | | |
|---|---|---|
| JP | 11-352938 | 12/1999 |
| JP | 2000-180820 | 6/2000 |
| JP | 2001-42838 | 2/2001 |
| JP | 2002-041008 (A) | 2/2002 |
| JP | 2002-91400 | 3/2002 |
| JP | 2002-091400 (A) | 3/2002 |
| JP | 2006-343706 (A) | 12/2006 |
| JP | 2007-134956 (A) | 5/2007 |
| WO | WO 2004/097787 (A1) | 11/2004 |

* cited by examiner

Fig. 8

| INPUT SWITCH | | LCD DRIVE MODE |
|---|---|---|
| 1 | TV TERMINAL | CLEAR MOVING IMAGE |
| 2 | DVI TERMINAL | CLEAR STILL IMAGE |
| 3 | S TERMINAL 1 | CLEAR MOVING IMAGE |
| 4 | HDMI TERMINAL 1 | CLEAR MOVING IMAGE |
| 5 | HDMI TERMINAL 2 | CLEAR MOVING IMAGE |
| 6 | VIDEO TERMINAL 1 | |
| 7 | VIDEO TERMINAL 2 | CLEAR MOVING IMAGE |
| 8 | VIDEO TERMINAL 3 | CLEAR MOVING IMAGE |

| |
|---|
| CLEAR MOVING IMAGE |
| CLEAR STILL IMAGE |
| NORMAL |

TELEVISION SET

INCORPORATION BY REFERENCE

This application claims priority on convention based on Japanese Patent Application No. 2007-206989. The disclosure thereof is incorporated herein by reference.

BACKGROUND OF THE INVENTION

1. Field of the Invention

The present invention relates to a television set having an active matrix type display apparatus.

2. Description of Related Art

A personal computer (PC) has widespread and the number of users who have a plurality of personal computers in homes increase. During such users, there is a request of connecting the personal computer to a television set. However, a wide area is necessary for installation of a plurality of monitors, and a fee is required for the number of monitors. Thus, a new demand arises in which only the personal computer is purchased without a display unit and the television set is used as a display unit. Typically, a display with a tuner is referred to as a television set, and a display with no tuner is referred to as a monitor.

As one of the typical thin type displays, an active matrix type liquid crystal display apparatus is known. In the liquid crystal display apparatus, scanning lines are used to select rows of pixels and data lines are supplied with display signals for grayscale data of the pixels. The pixel is arranged at each of intersections of the scanning lines and the data lines, and is provided with a TFT (Thin Film Transistor) transistor and a pixel electrode. Liquid crystal is filled between the pixel electrode and a common electrode opposite thereto. As the liquid crystal, a normally black liquid crystal is used in which a transmittance is the lowest (black) in a voltage non-application state. This normally black liquid crystal will be described below.

The liquid crystal display apparatus employs a method of inverting the polarity of the display signal supplied to the pixel, in order to prevent the liquid crystal material from being deteriorated. In other words, the pixel is alternately driven. As the inverting method, the following 4 methods are known:

[1] A frame inversion drive in which the polarity of the voltage applied to the common electrode is inverted for each frame, while the polarities of the display signals supplied to the data lines are not changed.

[2] A line inversion drive in which the polarity of the voltage applied to the common electrode is inverted for each horizontal synchronization and for each frame, while the polarities of the display signals supplied to the data lines are not changed.

[3] A column inversion drive in which the polarity of the display signal is inverted for each frame, such that the voltage of the common electrode is fixed and the polarities of the display signals of the data lines adjacent to each other are different, as shown in FIGS. 1A and 1B.

[4] A 1H dot inversion drive in which the polarity of the display signal is inverted for each horizontal synchronization and for each frame, while the voltage of the common electrode is fixed and the polarities of the display signals of the data lines adjacent to each other are different, as shown in FIGS. 2A and 2B.

It is known that flicker is likely to be recognized in case of a same display pattern as a driving method. In a frame inversion drive, the flicker is likely to be recognized in a perfectly gray display. In a line inversion drive, the flicker is likely to be recognized in a horizontal stripe pattern. In a column inversion drive, the flicker is likely to be recognized in a vertical stripe pattern. In a dot inversion drive, the flicker is likely to be recognized in a checker pattern.

When the flicker, a crosstalk and the like are totally determined, the image qualities are degraded in the order of a 1H dot inversion drive, the line inversion drive, the column inversion drive and the frame inversion drive. This order also implies the order of larger electric power consumption. The image quality and the electric power consumption have the relation of trade-off.

In the liquid crystal television in which the number of the effective scanning lines is 720 or more (so-called high definition liquid crystal television), the increase in the number of the scanning lines causes one horizontal synchronization period to be short and also causes the number of pixels to be increased. Thus, the capacitance of the common electrode is increased, which prevents the voltage of the common electrode from being stabilized within a predetermined period. Therefore, it is difficult to employ a method of inverting the voltage of the common electrode (the frame inversion drive and the line inversion drive). In the following description, the merit and demerit of the column inversion drive and the 1 or 2H dot inversion drive in which the voltage of the common electrode is fixed will be described.

The merit of the column inversion drive lies in that the electric power consumption is small. The demerit lies in that the flicker and the vertical crosstalk are likely to be generated and the moving image quality is poor. As mentioned above, the flicker is likely to be recognized in the vertical stripe pattern. The vertical crosstalk is likely to be generated in the pattern in which white or black is displayed on a window portion as shown in FIG. 3 and its circumference is displayed in a middle gray-scale pattern.

The vertical crosstalk in the column inversion drive is mainly caused through change of the voltage of the pixel electrode in one frame period due to the off-current of the pixel. The off-current of the pixel is varied due to the voltage difference between the source and drain of the TFT. The same polarity of voltage is applied to the pixel, which is scanned in an initial part of the frame, in the majority part of the frame. Thus, the voltage difference between the source and drain of the TFT is small. The opposite polarity of voltage is applied to the pixel, which is scanned in the final part of the frame, in the majority part of one frame. Thus, the voltage difference between the source and drain of the TFT is large. In short, as the voltage difference between the source and drain of the TFT is larger, the off-current of the pixel is greater. In particular, the pixel scanned in the final part of the frame is large in a voltage variation amount. Accordingly, the flicker and the crosstalk are likely to be generated.

The merit of the 1H dot inversion drive lies in excellent image quality. Although the flicker is likely to be recognized in a checker pattern, the flicker and the crosstalk are small in the other patterns. The demerit lies in that the electric power consumption is large. Also, when the number of the scanning lines is increased, a brightness inclination is likely to be generated. The brightness inclination implies a phenomenon that a contrast is high at the pixels near to a data line driving IC is and that the contrast is low at the pixels distant from the data line driving IC. When a perfectly white pattern whose drive voltage is high is displayed, the pixels on a near-side are bright and the pixels on a distant side are dark. According to a drive waveform shown in FIG. 4, in the pixels on the distant side, the waveform of a display signal is dull, and the display signal cannot be sufficiently applied to the pixel electrode. This is because the data line becomes long in the larger scale of a liquid crystal panel, so as to increase parasitic capacitance of the data line. Also, the design of a higher definition increases the number of the scanning lines and makes one horizontal synchronization period short. Also, in the 1H dot inversion drive, the data lines adjacent to each other are temporarily shorted to collect charges before the polarity is switched, in order to make the electric power consumption small. By the charge collection, the electric power to charge and discharge the charges to and from the data line is reduced to ½. However, the charge collecting period is required, which reduces a write period to the pixels.

FIGS. 5A and 5B are diagrams showing the polarity of the pixel to which the 2H dot inversion drive is applied. The merit of the 2H dot inversion drive lies in that the electric power consumption is small, as compared with the 1H dot inversion drive. The demerit of the 2H dot inversion drive lies in that the waveform dullness of the display signal causes a horizontal pattern irregularity to be generated in a perfectly white pattern, a perfectly gray pattern and the like. FIG. 6 shows a waveform view of the 2H dot inversion drive. In FIG. 6, the waveform of the display signal on the distant side of the data line is represented by a solid line. According to this, although in an $(m-1)^{th}$ horizontal period, the waveform dullness is generated and a target voltage is not attained, an objective voltage is attained in an $m^{th}$ horizontal period. Also, in FIG. 6, the waveform of the display signal supplied to a $(m-1)^{th}$ pixel electrode is represented by an alternate long and short dash line, and the waveform of the display signal supplied to an $m^{th}$ pixel electrode is represented by an alternate long and two short dashes line. The waveform dullness causes the difference to be generated between the waveform in the $(m-1)^{th}$ pixel electrode and the waveform in the $m^{th}$ pixel electrode, and the voltages written into the pixel electrodes are made different, which results in the horizontal line irregularity.

The fact that the image quality of the dot inversion drive is good is known from Japanese Patent Application Publication (JP-P2001-042838A). This publication describes a technique for carrying out the dot inversion drive with no relation to a signal system used in a liquid crystal display apparatus. On the contrary, the fact that the image quality is poor when the polarity of the display signal is inverted for each frame or each field is also known from Japanese Patent Application Publication (JP-A-Heisei, 11-352938). This publication describes that a flicker is likely to be recognized when the polarity of a display signal is inverted at a time of shift from an odd-numbered field to an even-numbered field, in an interlace drive. Japanese Patent Application Publication (JP-P2000-180820A) describes a technique for carrying out a color display without using color filters. In this technique, one frame is divided into a red field, a green field and a blue field, and the polarity of the pixel electrode is inverted in each field.

In the column inversion drive, in order to decrease a voltage variation amount of the pixel electrode, the flicker and the vertical crosstalk can be reduced by carrying out at least one of the following items:

[a] making a drive frequency high,
[b] increasing a storage capacity of the pixel, and
[c] decreasing the off-current of the pixel.

In the column inversion drive, a technique for making the drive frequency high is known from Japanese Patent Application Publication (JP-P2002-091400A). This publication describes that a motion detecting circuit is provided in a video signal processor, and the motion detecting circuit carries out the column inversion drive by making a drive frequency high at the time of a video signal and carries out the dot inversion drive at a time of a still image.

In the technique described in the Japanese Patent Application Publication (JP-P2002-091400A), when the motion detecting circuit in the video signal processor automatically switches a drive system between the dot inversion drive and the column inversion drive, the flicker is reversely increased. At the time of the shift from the column inversion drive to the dot inversion drive, the drive frequency is delayed. In the first frame, the pixels driven in the same polarity are arranged every two columns. Thus, the flicker is horizontally generated. Moreover, in the display on the personal computer, since there are many moving images, which are cyclically flashed, the flicker becomes outstanding if the driving system is changed.

In short, in order to effectively operate the motion detecting circuit, it is necessary to adequately set a judgment reference for a motion in the moving image. For this purpose, the frame memories for several frames or more are required in the video signal processor. This increases the circuit scale of the video signal processor.

Also, in the dot inversion drive, when the drive frequency is made high in order to improve the image quality, the electric power consumption is increased. The increase in the electric power consumption results in heat generation in the data line driving IC and remarkable shortening in the life of the data line driving IC.

SUMMARY

In a first aspect of the present invention, a television set includes a television set body section which has a display panel in which pixels are arranged at intersections of scan lines and data lines in a matrix; and first and second input terminals provided for the television set body section. A first video signal is displayed on the display panel in a first drive system when the first video signal supplied to the first input terminal is selected. A second video signal is displayed on the display panel in a second drive system when the second video signal supplied to the second input terminal is selected.

In a second aspect of the present invention, a method of displaying a display signal on a display panel in a television set, includes displaying a first video signal as the display signal on the display panel in a first drive system when the first video signal supplied to a first input terminal is selected; and displaying a second video signal as the display signal on the display panel in a second drive system when the second video signal supplied to a second input terminal is selected.

According to the present invention, the optimal drive mode is set in advance for an input terminal of a television, and it can be displayed in a drive style suitable for a picture, in response to the switching of the input terminal. Thus, the electric power consumption of a television body (the data line driving circuit installed therein) is reduced, which can drop the heat generation in the data line driving circuit and can extend the life of the data line driving circuit. Also, a user can select the driving style suitable for the picture. Hence, the pattern, frequency and the like of the picture signal are not required to be judged, which enables the removal of a judging circuit. Moreover, since the driving style is not frequently changed, the frequency of the flicker generations can be decreased.

BRIEF DESCRIPTION OF THE DRAWINGS

The above and other objects, advantages and features of the present invention will be more apparent from the following description of certain embodiments taken in conjunction with the accompanying drawings, in which:

FIG. 8 is a setting example of a liquid crystal drive mode of each input terminal of the television set in the first embodiment of the present invention;

DESCRIPTION OF THE PREFERRED EMBODIMENTS

Hereinafter, a television set of the present invention will be described with reference to the attached drawings.

First Embodiment

In the television set according to a first embodiment of the present invention, a liquid crystal drive mode is set for each input terminal of the television set, and an inversion period of a display signal to be supplied to data lines of a liquid crystal panel is changed in response to the selection of the input terminal.

Figures 1A, 1B:
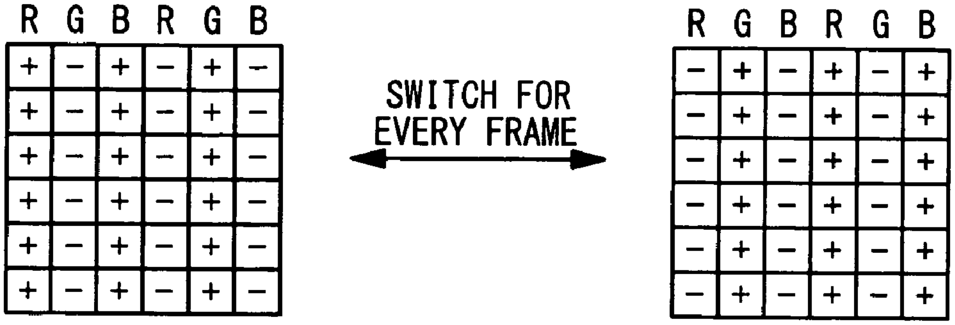
FIGS. 1A and 1B are diagrams showing a distribution of voltage polarities of pixel electrodes of a liquid crystal panel in a column inversion drive.
Figures 2A, 2B:
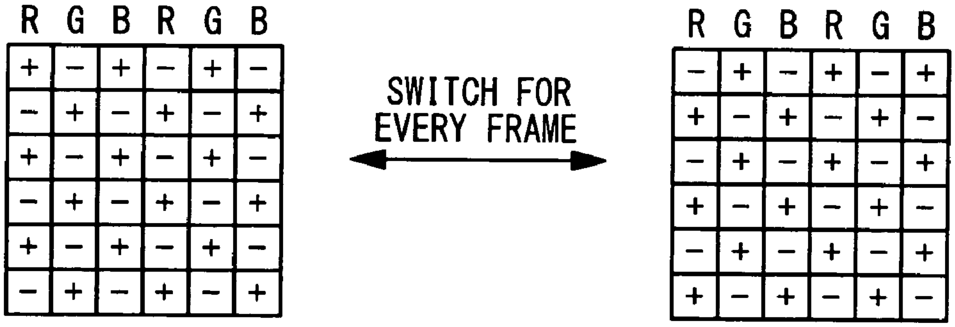
FIGS. 2A and 2B are diagrams showing a distribution of voltage polarities of pixel electrodes of the liquid crystal panel in a 1H dot inversion drive.
Figure 3:
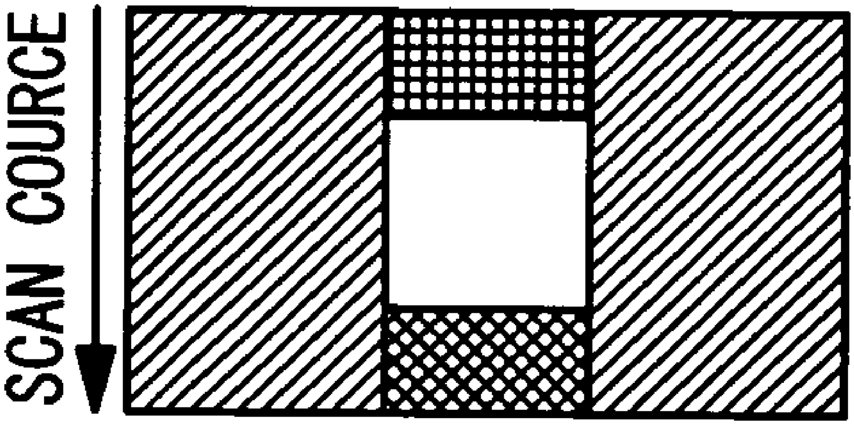
FIG. 3 is a diagram showing a vertical crosstalk.
Figure 4:
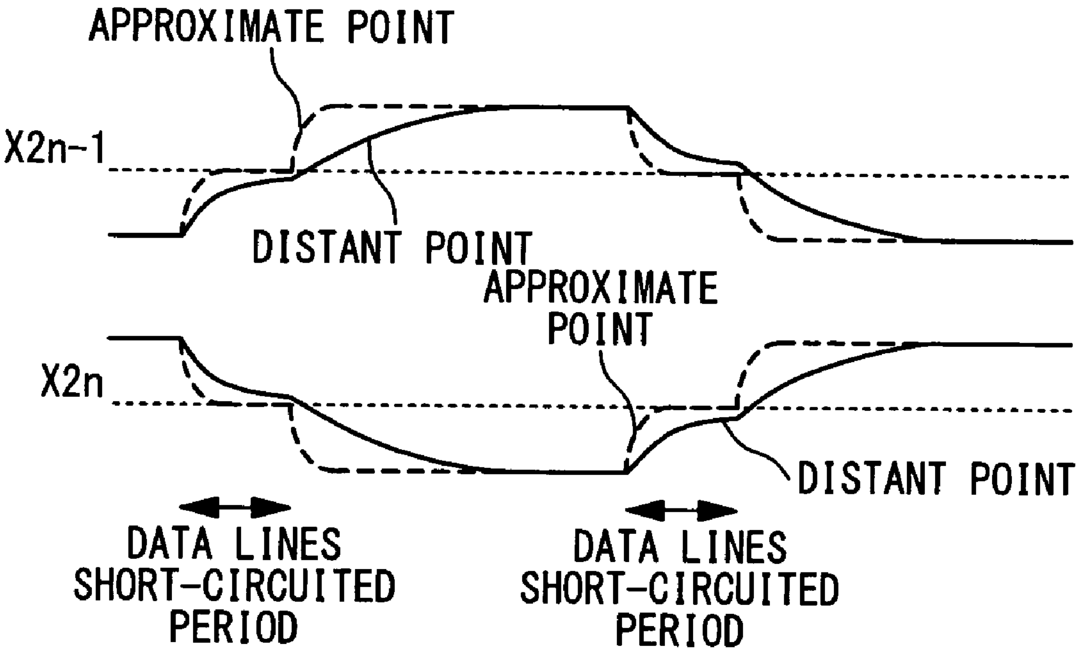
FIG. 4 is a diagram showing drive waveforms of data lines in the 1H dot inversion drive.
Figure 5A:
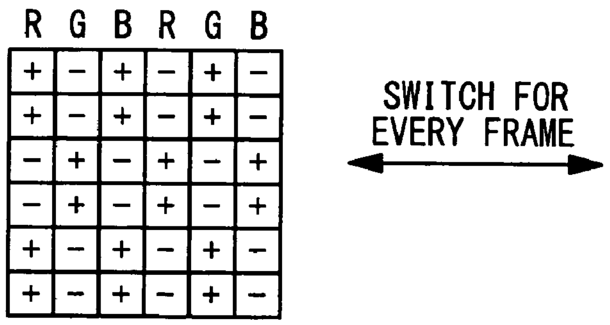
FIGS. 5A and 5B are diagrams showing a distribution of voltage polarities of pixel electrodes of the liquid crystal panel in a 2H dot inversion drive.
Figure 5B:
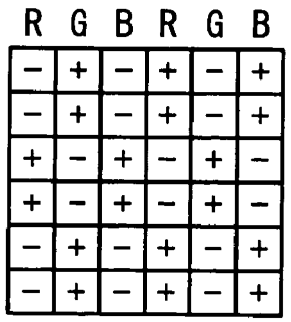
Figure 6:
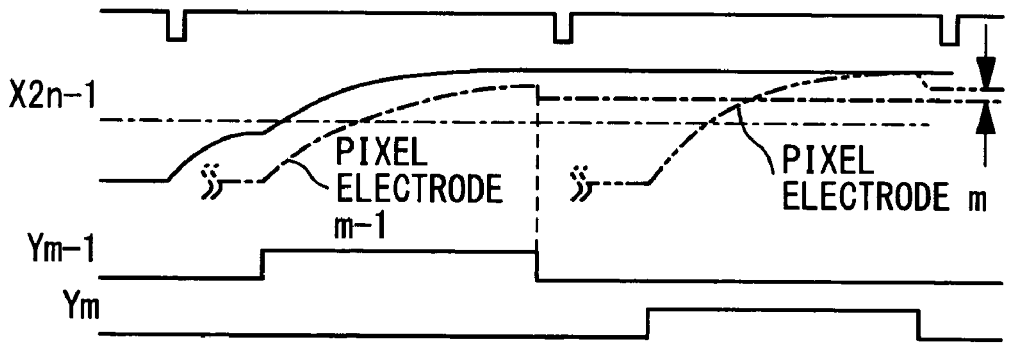
FIG. 6 is a diagram showing drive waveforms of data lines in the 2H dot inversion drive and voltage waveforms of pixel electrodes.
Figure 7:
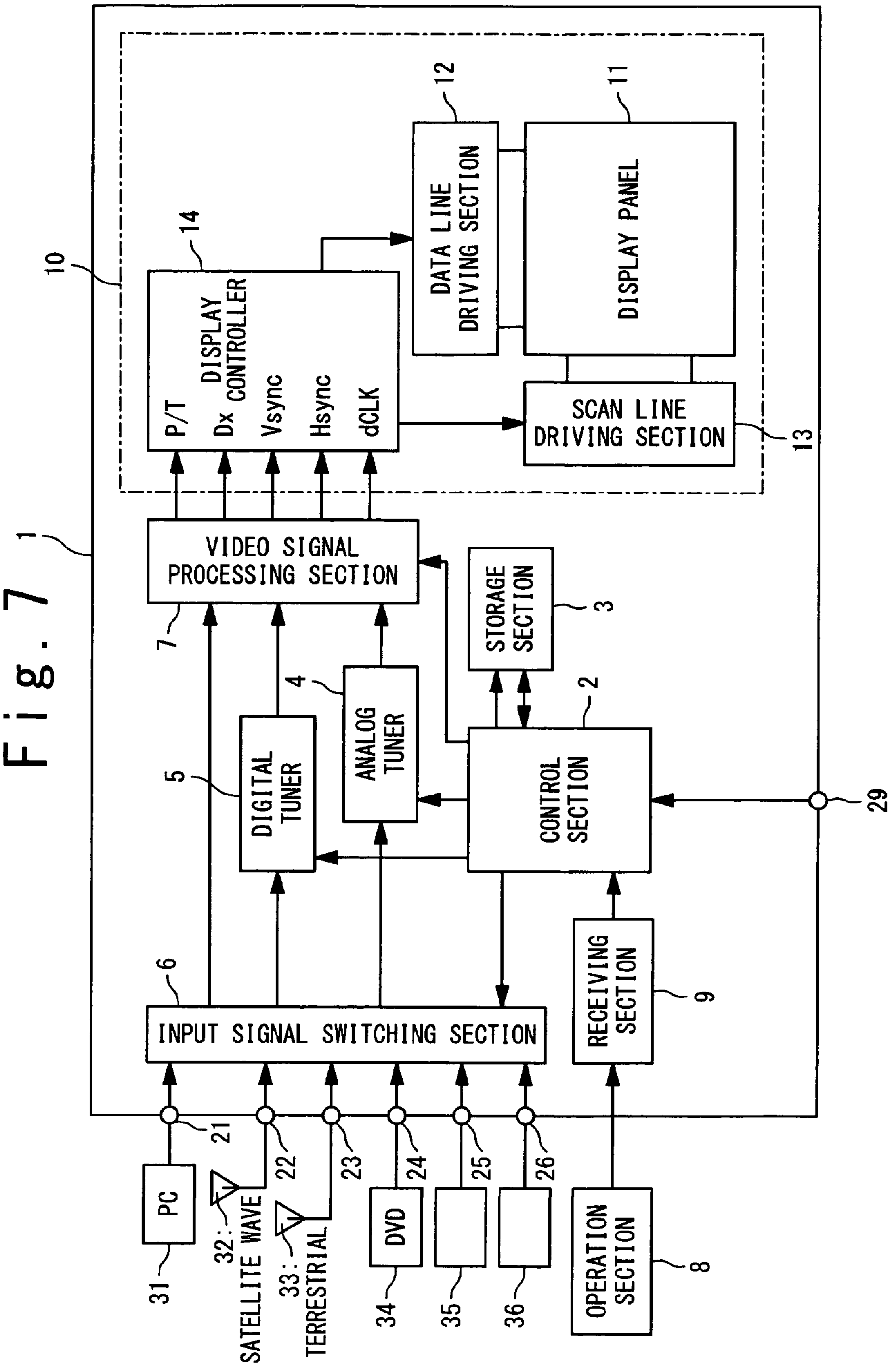
FIG. 7 is a block diagram of a television set according to a first embodiment of the present invention.

FIG. 7 is a block diagram showing the configuration of the television set in the first embodiment of the present invention. The television set in this embodiment contains a television set body 1. The television set body 1 includes a control section 2, a storage section 3, an analog tuner 4, a digital tuner 5, an input signal switching section 6, a video signal processing section 7, a receiving section 9, a liquid crystal display unit 10, a plurality of input terminals 21 to 26 and an operation button 29. Moreover, the television set in this embodiment contains an operation section 8. As the operation section 8, a remote control is exemplified. The receiving section 9 receives a signal from the remote control 8. The input signal switching section 6 is connected to the plurality of input terminals 21 to 26, the analog tuner 4, the digital tuner 5 and the video signal processing section 7. The analog tuner 4 and the digital tuner 5 are connected to the video signal processing section 7. The control section 2 is connected to the storage section 3, the analog tuner 4, the digital tuner 5, the input signal switching section 6 and the video signal processing section 7 and controls the respective sections 3 to 7. Also, the control section 2 is connected to the receiving section 9 and the operation button 29 and controls the respective sections 3 to 7 on the basis of the signal from the receiving section 9 and the operation of the operating button 29. The storage section 3 stores setting data of video/sound, and the like. The television set in this embodiment treats a sound signal, in addition to the video signal. However, input/output terminals, circuits, speakers and the like relating to a sound process are not illustrated. Also, only the input terminals are illustrated, and the output terminals are not illustrated. The operation section 8 such as a remote controller contains a reproduction button, a stop button and a temporary stop button for reproducing, stopping and temporarily stopping the video/sound signals, respectively, and an input switching button for switching an input signal, which will be described later, for the television set in this embodiment.

At first, the liquid crystal display unit 10 is described. The liquid crystal display unit 10 contains a liquid crystal display panel 11, a data line driving circuit 12 for driving data lines in accordance with a display signal, a scan line driving circuit 13 for driving scan lines, and a display controller 14 for controlling the data line driving circuit 12 and the scan line driving circuit 13. The liquid crystal display unit 10 includes a power supply for supplying a power to the respective driving circuits, a backlight and the like, although they are not shown.

The liquid crystal display panel 11 includes a plurality of scan lines Y and a plurality of data lines X. A pixel is arranged at each of intersections of the scan lines Y and the data lines X, and this is composed of a TFT (Thin Film Transistor) element and a pixel electrode. The liquid crystals are filled between the pixel electrode and a common electrode opposite to it. In this embodiment, the liquid crystal is assumed to be a normal black in which a transmittance is the lowest (black) in a voltage non-application case.

For the liquid crystal display panel 11, a method of inverting the polarities of the voltages applied to the pixels is employed in order to suppress the liquid crystal material of the pixel from being deteriorated. This embodiment employs the following drives, namely,

[i] the 1F inversion drive in which the voltage of the common electrode is fixed, the polarities of the display signal supplied to the data lines adjacent to each other are different, and the polarities of the display signal are inverted for each frame period, or

[ii] the 1H inversion drive in which the polarities of the display signal supplied to the data lines adjacent to each other are inverted for each horizontal synchronization period and for each frame period.

Also, the scan lines are sequentially scanned (progressive, non-interlace).

Also, a pixel array in the liquid crystal panel 11 is a 2-stage zigzag arrangement in which polarities of the pixels in a column direction are same for every two columns. The polarities of the respective pixels will be described below in detail with reference to FIGS. 9A and 9B, and 10A and 1B. The number of the pixels in the liquid crystal panel 11 is assumed to be 6 rows×6 columns for the purpose of simplification. The pixel of an $i^{th}$ row and a $j^{th}$ column is represented as the pixel (i, j). The pixel (i, 1) and the pixel (i, 2) on the first and second columns will be described below. Then, the color filters for a red (R), a green (G) and a blue (B) are arranged in the shape of vertical stripes. In such a way that the parasitic capacitances of the data lines X1 and X7 are equal to the parasitic capacitances of the other data lines, dummy pixels columns are provided on the rightmost and leftmost side. The light of the backlight of the dummy pixels is shut off. The pixels in the left dummy pixel column are assumed to be the pixels (i, 0), and the pixels in the right dummy column are assumed to be the pixels (i, 7). In FIGS. 9A and 9B, and 10A and 10B, although nothing is written on the dummy pixel (0, 0), the same pixel as the others is provided. Since the signal from the data line is not supplied, the polarity is unstable, and it is not necessary from the viewpoint of the explanation of the pixel of the pixel, and this is omitted.

Figure 9B:
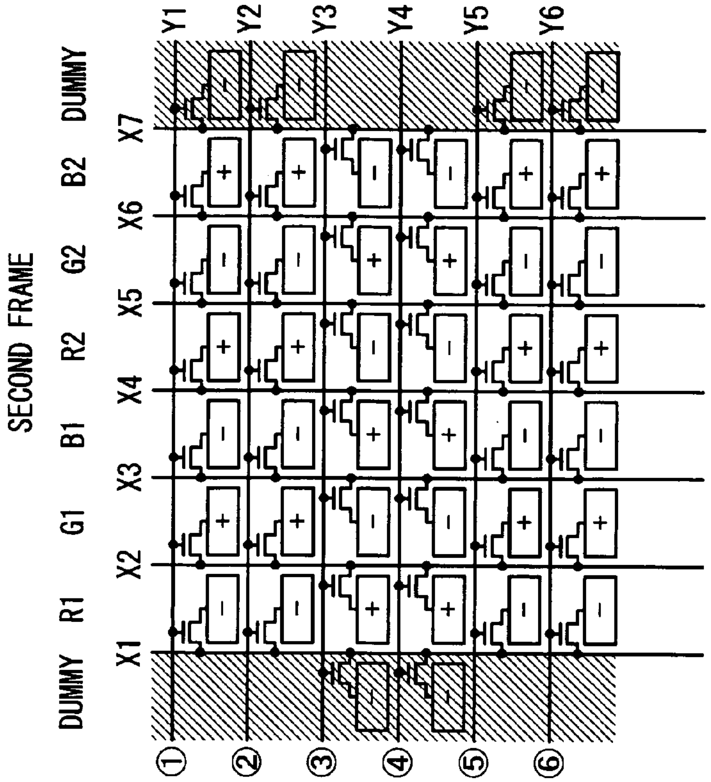
FIGS. 9A and 9B are diagrams showing a distribution of voltage polarities of pixel electrodes of the television set in the first embodiment of the present invention.
Figure 9A:
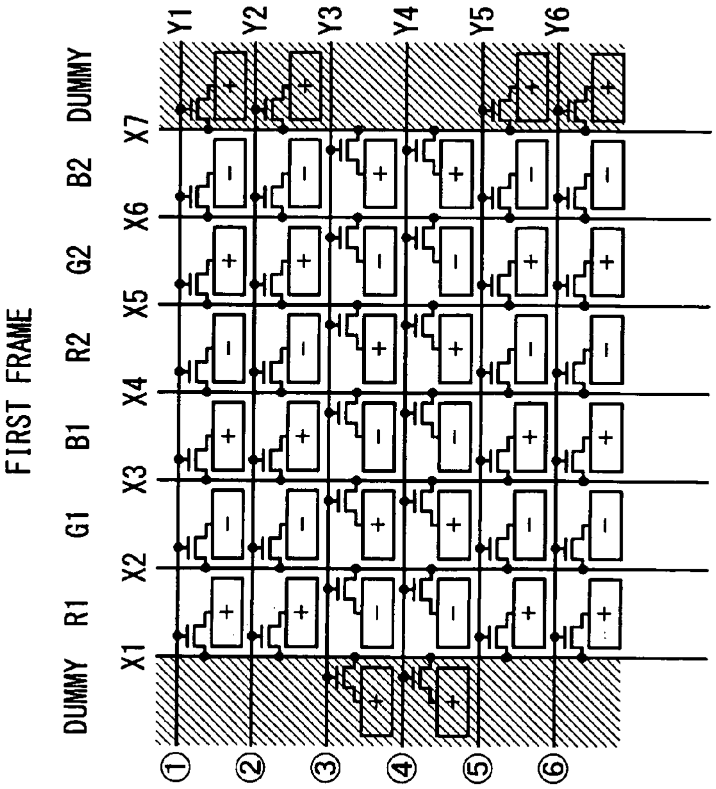

The polarities of the pixels will be described below. FIGS. 9A and 9B show the polarities of the pixels when the 1F inversion drive is carried out. The data line driving circuit 12 inverts the polarity of the display signal for each frame period, in response to a "normal mode" or a "moving image clean mode" as a liquid crystal drive mode, which will be described later. The scan lines are sequentially driven from the top to the bottom. In a first horizontal period of a first frame, the pixel (1, 1) is driven in a positive polarity "+", and the pixel (1, 2) is driven in a negative polarity (−). In a second horizontal period of the first frame, the pixel (2, 1) is driven in the positive polarity "+", and the pixel (2, 2) is driven in the negative polarity (−). In a third horizontal period of the first frame, the pixel (3, 1) is driven in the negative polarity (−) and the pixel (3, 2) is driven in the positive polarity "+". Also, in a fourth horizontal period of the first frame, the pixel (4, 1) is driven in the negative polarity (−), and the pixel (4, 2) is driven in the positive polarity "+". In a first horizontal period of a second frame, the pixel (1, 1) is driven in the negative polarity (−), and the pixel (1, 2) is driven in the positive polarity "+". In a second horizontal period of the second frame, the pixel (2, 1) is driven in the negative polarity (−), and the pixel (2, 2) is driven in the positive polarity "+". In a third horizontal period of the second frame, the pixel (3, 1) is driven in the positive polarity "+", and the pixel (3, 2) is driven in the negative polarity (−). Also, in a fourth horizontal period of the second frame, the pixel (4, 1) is driven in the positive polarity "+", and the pixel (4, 2) is driven in the negative polarity (−). In this way, according to the 2-stage zigzag arrangement, in the 1F inversion drive, the 2H dot inversion display is exhibited in a pseudo manner as shown in FIGS. 9A and 9B. The 2H dot inversion drive is low in generation frequency, as compared with a vertical stripe pattern, a horizontal stripe pattern and a checker pattern. Thus, a frequency of flicker generation is decreased. However, in the 1F inversion drive, when the drive frequency is low, the vertical crosstalk is likely to be generated in a window pattern.

Figure 10B:
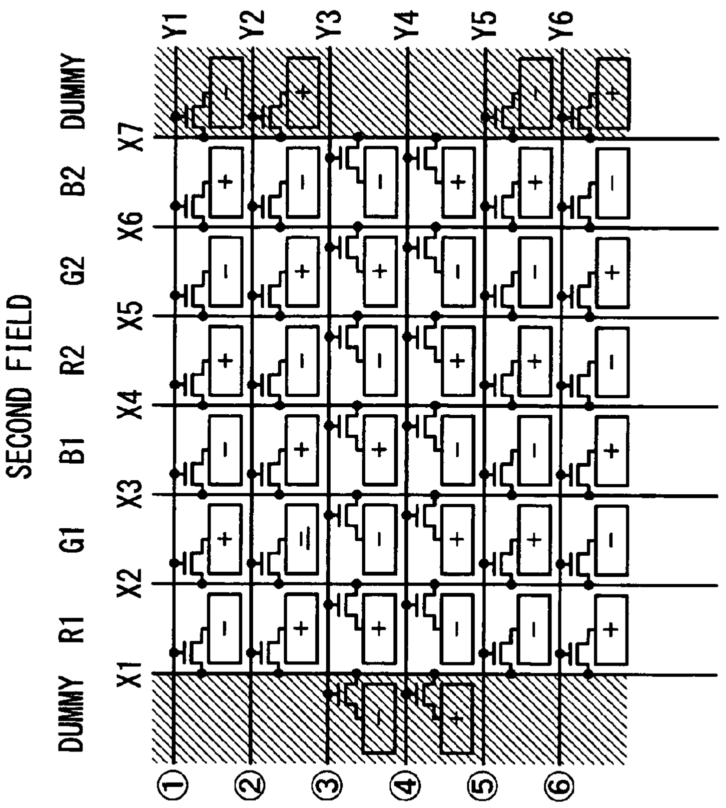
FIGS. 10A and 10B are diagrams showing a distribution of voltage polarities of pixel electrodes of the television set in the first embodiment of the present invention.
Figure 10A:
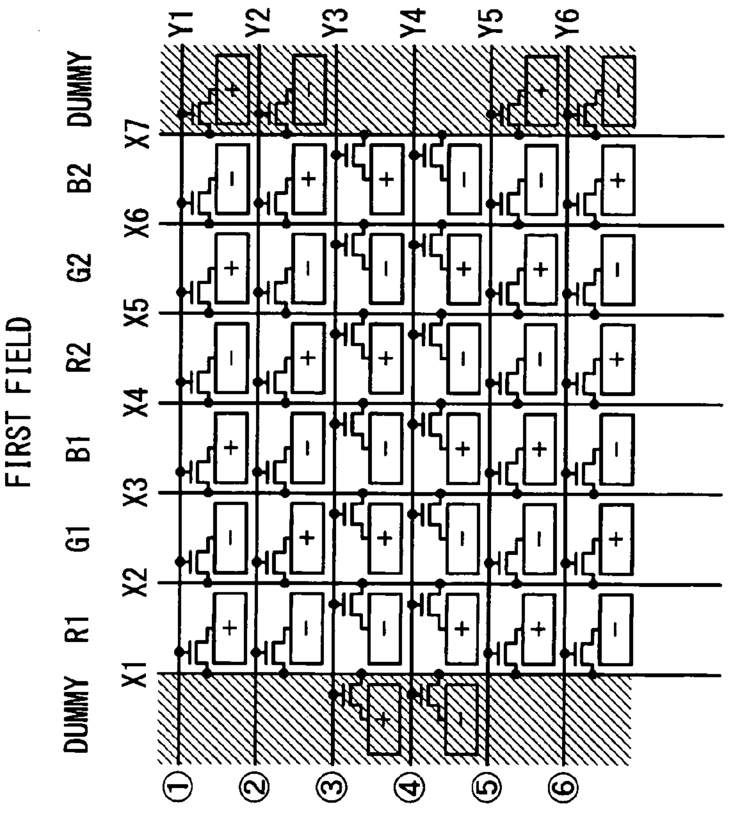

FIGS. 10A and 10B show the polarities of the pixels when the 1H inversion drive is carried out. The data line driving circuit 12 inverts the polarity of the display signal for each horizontal synchronization period and for each frame period in response to a "still image clean mode" as the liquid crystal drive mode, which will be described later. The scan lines are sequentially driven from the top to the bottom. In the first horizontal period of the first frame, the pixel (1, 1) is driven in the positive polarity "+", and the pixel (1, 2) is driven in the negative polarity (−). In the second horizontal period of the first frame, the pixel (2, 1) is driven in the negative polarity (−), and the pixel (2, 2) is driven in the positive polarity "+". In the third horizontal period of the first frame, the pixel (3, 1) is driven in the negative polarity (−), and the pixel (3, 2) is driven in the positive polarity "+". In the fourth horizontal period of the first frame, the pixel (4, 1) is driven in the positive polarity "+", and the pixel (4, 2) is driven in the negative polarity (−). In the first horizontal period of a second frame, the pixel (1, 1) is driven in the negative polarity (−), and the pixel (1, 2) is driven in the positive polarity "+". In the second horizontal period of the second frame, the pixel (2, 1) is driven in the positive polarity "+", and the pixel (2, 2) is driven in the negative polarity (−) In the third horizontal period of the second frame, the pixel (3, 1) is driven in the positive polarity "+", and the pixel (3, 2) is driven in the negative polarity (−). In the fourth horizontal period of the second frame, the pixel (4, 1) is driven in the negative polarity (−), and the pixel (4, 2) is driven in the positive polarity "+". In this way, according to the 2-stage zigzag arrangement, the 2H dot inversion display, which is deviated by one scan in a pseudo manner as shown in FIGS. 10A and 10B, is carried out in the 1H inversion drive.

In the 1H inversion drive, for each horizontal synchronization period, the respective data lines are shorted, and the charges accumulated on the data lines are collected, thereby reducing the electric power consumption. Since this charge collection requires the time of several micro seconds, the write time to the pixel becomes short. In the 1F inversion drive, the charge collection is not required to be carried out for each horizontal synchronization period. Thus, the write time can be made long, as compared with the 1H inversion drive. There may be a case that, when the number of the scan lines is increased, the 1F inversion drive is superior in image quality to the 1H inversion drive.

In the television set, the image quality of the video signal is important. For this reason, this embodiment employs a technique for making a drive frequency high, i.e., a so-called double speed drive, in order to suppress a motion blur of the video signal. As the double speed drive, a technique of a "frame interpolation" is employed which generates a new intermediate frame in accordance with a motion vector between a frame and a frame. The frame interpolation is carried out by the video signal processing section 7.

As described above, the vertical crosstalk that is the defect of the 1F inversion drive is improved by making the drive frequency high. On opposite, in the 1H inversion drive, when the drive frequency becomes high so that the writing to the pixel is insufficient, the image quality is deteriorated such as vertical line irregularity, and brightness inclination. In particular, the image quality is deteriorated in the patterns having a high appearance frequency such as a perfectly white pattern, and a perfectly gray pattern. Thus, the drive method in which the video signal is cleanest is a combination of the double speed drive and the 1F inversion drive.

Each of the input terminals 21 to 26 is set to the liquid crystal drive mode of any one of:

[I] a "normal mode" indicating the 1F inversion drive without any double speed drive;

[II] a "moving image clean mode" indicating the 1F inversion drive having the double speed drive; and

[III] a "still image clean mode" indicating the 1H inversion drive without any double speed drive. Those settings are stored in the storage section 3. The electric power consumption is larger in the order of "normal mode"<"moving image clean mode"<"still image clean mode" in a natural picture.

The input signal switching section 6 receives the picture/sound signal as an input signal from one input terminal among the input terminals 21 to 26. The switching between the input signals is carried out by the user who operates the input switch button on the operation section 8 while viewing the television set. The setting of the liquid crystal drive mode of each input terminal can be changed by the user who operates the operation section 8 while viewing the television set. FIG. 8 shows one example of a menu screen of the liquid crystal drive mode. The menu screen is stored in the storage section 3. When the user operates the input switch button on the operation section 8, the receiving section 9 receives an instruction corresponding to the input switch button. The control section 2 outputs the menu screen stored in the storage section 3 through the video signal processing section 7 to the liquid crystal display unit 10 in response to the instruction, and displays on the liquid crystal panel 11. The menu screen indicates an input switching data and the liquid crystal drive mode. The input switching data indicates the input terminals 21 to 26. Each of the input terminals 21 to 26 indicates one of a television set terminal, a DVI terminal, an S terminal 1, HDMI terminals 1 and 2, and video terminals 1, 2, and 3, as the input terminals used by the user. The liquid crystal drive modes corresponding to the television set terminal, the S terminal 1, the HDMI terminals 1, 2 and the video terminals 1, 2, 3 indicate a "moving image clean mode" as an initial setting value. The liquid crystal drive mode corresponding to the DVI terminal indicates a "still image clean mode" as the initial setting value. The liquid crystal drive mode corresponding to the video terminal 1 indicates any one of the "moving image clean mode", the "still image clean mode" and the "normal mode" as the initial setting value. In FIG. 8, the user can freely change the liquid crystal drive mode on the basis of the state in which the video terminal 1 is used.

The television broadcast has a satellite, a ground wave and a cable, as signal routes. In order to receive television broadcasting signals, a satellite antenna 32 and a ground wave antenna 33 are required. The input terminals 22 and 23 among the input terminals 21 to 26 are connected to the satellite antenna 32 and the ground wave antenna 33, as the input terminal for a satellite broadcast (there are a broadcasting satellite and a communications satellite) and the input terminal for a ground broadcast, respectively. The input signal switching section 6 receives an analog television broadcasting signal (video/sound signal) received by the ground wave antenna 33 through the input terminal 23 and outputs to the analog tuner 4. The analog tuner 4 receives and selects the analog television broadcasting signal (video/sound signal) outputted by the input signal switching section 6 and outputs the video/sound signal to the video signal processing section 7. Also, the input signal switching section 6 receives a digital television broadcasting signal (video/sound signal) received by the satellite antenna 32 through the input terminal 22 and outputs to the digital tuner 5. The digital tuner 5 receives and selects the digital television broadcasting signal (video/sound signal) outputted by the input signal switching section 6 and outputs the video/sound signal to the video signal processing section 7. The input terminal 22 for the satellite broadcast and the input terminal 23 for the ground broadcast are hereinafter referred to as television set terminals. The control section 2 sets the "moving image clean mode" as an initial setting value (default) of the liquid crystal drive mode corresponding to the terminals 22 and 23 on the menu screen. The control section 2 monitors the analog tuner 4, the digital tuner 5, the input signal switching section 6 and the video signal processing section 7, and notifies (outputs) the liquid crystal drive mode indicating the "moving image clean mode" to the video signal processing section 7, when the analog television broadcasting signal (video/sound signal) is outputted from the input terminal 23 through the input signal switching section 6 and the analog tuner 4 to the video signal processing section 7 or when the digital television broadcasting signal (video/sound signal) is outputted from the input terminal 22 through the input signal switching section 6 and the digital tuner 5 to the video signal processing section 7. In the cable broadcast, the input signal switching section 6 is connected through a set top box (this is one kind of a home terminal, and a box for the analog broadcast is referred to as a home terminal, and a box for the digital broadcast is referred to as the set top box, in many cases) to the television set terminals 22, 23.

The input terminals 24 and 26 among the input terminals 21 to 26 are connected to video output units 34 and 36, respectively, As the video output unit 34, a video signal recorder is known such as a video tape recorder and a DVD recorder. As the video output unit 36, a video camera, a game machine and the like are known. The input signal switching section 6 receives the analog video signal (video/sound signal) outputted by the video output unit 34 through the input terminal 24 and outputs to the analog tuner 4 or the video signal processing section 7. Depending on whether or not the tuner is built in the video output unit 34, the connection method to the antenna and the television set is changed. Thus, there may be a connection other than the connection shown in FIG. 7. Also, the input signal switching section 6 receives the analog video signal (video/sound signal) outputted by the video output unit 36 through the input terminal 26 and outputs to the video signal processing section 7. As the input terminals 24 to 26, a composite terminal, an S-terminal, a component terminal, a D-terminal (Japanese Peculiar Rule) and the like are known. The composite terminal is referred to as a video input terminal. The control section 2 sets the "moving image clean mode" as the initial setting value of the liquid crystal drive mode corresponding to the input terminals 24 and 26 on the menu screen. The control section 2 monitors the analog tuner 4, the input signal switching section 6 and the video signal processing section 7 and notifies the liquid crystal drive mode indicating the "moving image clean mode" to the video signal processing section 7, when the analog video signal (video/sound signal) is outputted from the input terminal 24 through the input signal switching section 6 (, the analog tuner 4) to the video signal processing section 7 or when the analog video signal (video/sound signal) is outputted from the input terminal 26 through the input signal switching section 6 to the video signal processing section 7.

When the input terminal used by the user is any of the input terminals (television terminals) 22 and 23 and the input terminals 24 to 26, if the user operates the temporary stop button on the operation section 8, a temporary stop mode {the video signal displayed on the display panel 11 of the television set body 1 is temporarily stopped (in this case, the sound signal is temporarily stopped)} is executed. Even if the operation section 8 is the remote control in the DVD recorder, the temporary stop mode is executed when it is linked to the television set and the user operates the temporary stop button on the remote controller in the DVD recorder. In this case, if the user operates the temporary stop button on the operation section 8, the operation section 8 sends a temporary stop signal to instruct the temporary stop mode. The control section 2 monitors the receiving section 9 and switches the liquid crystal drive mode corresponding to any of the input terminals 22, 23, 24 and 26 on the menu screen, from the "moving image clean mode" to the "still image clean mode", when the receiving section 9 receives the temporary stop signal from the operation section 8. The control section 2 notifies (outputs) the liquid crystal drive mode indicating this "still image clean mode" to the video signal processing section 7.

When the user releases the operation of the temporary stop button on the operation section 8, the execution of the temporary stop mode is ended. In this case, when the user releases the operation of the temporary stop button on the operation section 8, the operation section 8 sends a release signal to release the instruction of the temporary stop mode (the temporary stop signal). The control section 2 monitors the receiving section 9 and switches the liquid crystal drive mode corresponding to the input terminals 22, 23, 24 and 26 on the menu screen, from the "still image clean mode" to the "moving image clean mode". The control section 2 notifies (outputs) the liquid crystal drive mode indicating this "moving image clean mode" to the video signal processing section 7.

The input terminal 21 among the input terminals 21 to 26 is connected to a personal computer (PC) 31. A mini D-sub15 terminal, a DVI (Digital Visual Interface) terminal or the like is known as the input terminal 21. The control section 2 sets the "still image clean mode" as the initial setting value of the liquid crystal drive mode corresponding to the television terminal 21 on the menu screen. The control section 2 monitors the analog tuner 4, the digital tuner 5, the input signal switching section 6 and the video signal processing section 7 and reports (outputs) the liquid crystal drive mode indicating "still image clean mode" to the video signal processing section 7, when the video/sound signal is outputted from the input terminal 21 through the input signal switching section 6 to the video signal processing section 7.

The input terminal 25 among the input terminals 21 to 26 is used as an HDMI terminal and connected to a picture output unit 35. The HDMI (High-Definition Multimedia Interface) implies the specification in which a sound sending function, a copyright protecting function, a color difference sending function and the like are added to the DVI. The PC and the DVD recorder which treat a digital video signal are known as the video output unit 35. There is a case that a copy control signal for indicating the limit of a copy for the sake of a copyright protection is added to this digital video signal.

The control section 2 monitors the analog tuner 4, the digital tuner 5, the input signal switching section 6 and the video signal processing section 7 and sets the "moving image clean mode" as the initial setting value of the liquid crystal drive mode corresponding to the HDMI terminal 25 on the menu screen, if the copy control signal is added to the digital video signal. The control section 2 notifies (outputs) the liquid crystal drive mode indicating the "moving image clean mode" to the video signal processing section 7, when the digital video signal (video/sound signal) is outputted from the HDMI terminal 25 through the input signal switching section 6 to the video signal processing section 7.

On the other hand, the control section 2 switches the liquid crystal drive mode corresponding to the HDMI terminal 25 on the menu screen, from "a moving image clean mode" to "a still image clean mode", if the copy control signal is not added to the digital video signal, as the monitored result. The control section 2 notifies (outputs) the liquid crystal drive mode indicating the "still image clean mode" to the video signal processing section 7.

There is a case that the television set in this embodiment incorporates a HDD (Hard Disk Drive) and the video signal from the HDD is selected. In this case, the control section 2 sets the "video signal clear mode" as the initial setting value of the liquid crystal drive mode corresponding to the HDMI terminal 25 on the menu screen.

Although not shown, there is a case that the television set body 1 further contains an input unit into which a medium (such as an SD card) for storing a video signal or a still image signal is inserted and the input unit has a medium connection input terminal as the input terminal connected to the medium. In this case, the input unit determines a moving image or a still image, in accordance with an extension of a file stored in the medium, through the input terminal and then generates a determination result. For example, if a kind of the extension is related to JPEG (Joint Photographic Experts Group) as the determination result, the control section 2 sets the "still image clean mode" as the liquid crystal drive mode corresponding to the medium connection input terminal, and if the kind of the extension is related to MPEG (Moving Picture Experts Group) as the determination result, the control section 2 sets the "moving image clean mode" as the liquid crystal drive mode corresponding to the medium connection input terminal on the menu screen.

As mentioned above, the video/audio signal is outputted from any one of the analog tuner 4, the digital tuner 5 and the input signal switching section 6 in accordance with the control of the control section 2. The video signal processing section 7 receives the video/audio signal. The video signal processing section 7 executes various processes such as a frame interpolating process, a converting process of a scanning system (which converts a signal of an interlace system into a signal of a progressive system), a converting process of a resolution on the video signal. Also, the video signal processing section 7 outputs a grayscale data Dx to display the video signal, and control signals Vsync, Hsync, dCLK and P/T, to the liquid crystal display unit 10. The signal Vsync is a vertical synchronization signal, the signal Hsync is a horizontal synchronization signal, and the signal dCLK is a dot clock signal. The signal P/T is a signal for switching the inversion period of the polarity of the display signal of the data line. Here, the video signal processing section 7 generates the signal P/T for inverting the polarity of the display signal for each frame period, when the "normal mode or the "moving image clean mode" is notified as the liquid crystal drive mode. Also, the video signal processing section 7 generates the signal P/T for inverting the polarity of the display signal for each horizontal synchronization period and for each frame period, when the "still image clean mode" is notified as the liquid crystal drive mode.

Figure 11A:
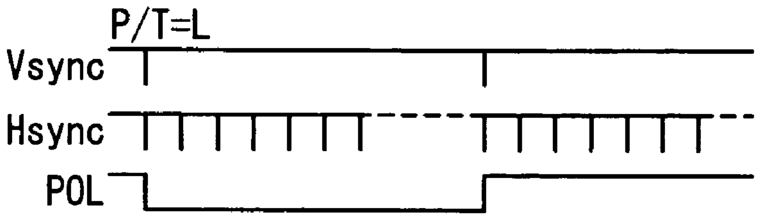
FIG. 11A is a timing chart of a signal outputted from a display controller in the first embodiment of the present invention.
Figure 11B:
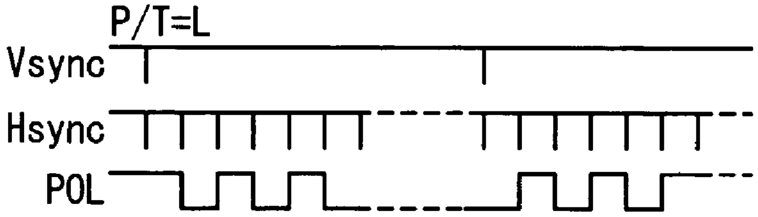
FIG. 11B is a timing chart of the signal outputted from the display controller in the first embodiment of the present invention.

The display controller 14 in the liquid crystal display unit 10 changes the inversion period of a polarity inversion signal POL outputted to the data line driving circuit 12 in response to the signal P/T. This will be described below with reference to FIGS. 11A and 11B. If the signal P/T is "L", the polarity inversion signal POL keeps "L" or "H" in one frame period. If the signal P/T is "H", the polarity inversion signal POL is inverted for each horizontal synchronization period and for each frame period. The display signal outputted from the data line driving circuit 12 is also inverted in accordance with this polarity inversion signal POL.

Figure 12:
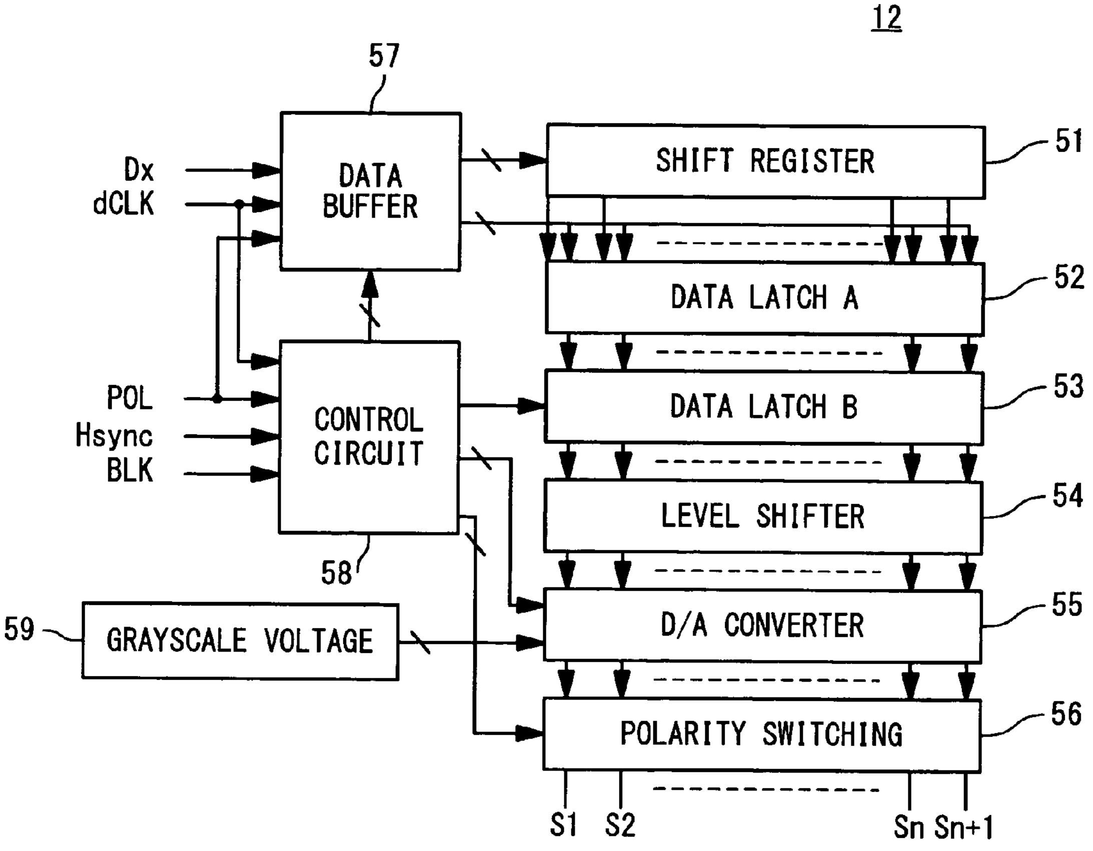
FIG. 12 is a block diagram of a data line driver of the television set in the first embodiment of the present invention.
Figure 13A:
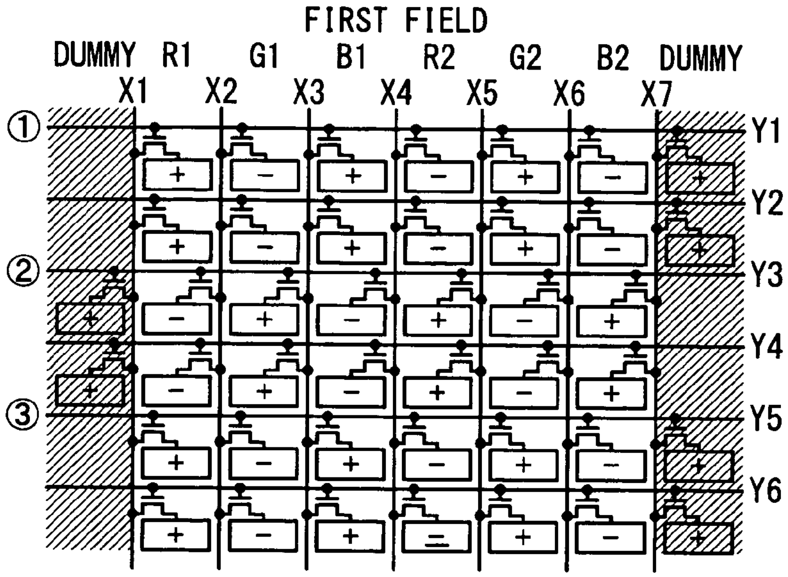
FIGS. 13A to 13D are diagrams showing a distribution of voltage polarities of pixel electrodes of the television set in a second embodiment of the present invention.
Figure 13B:
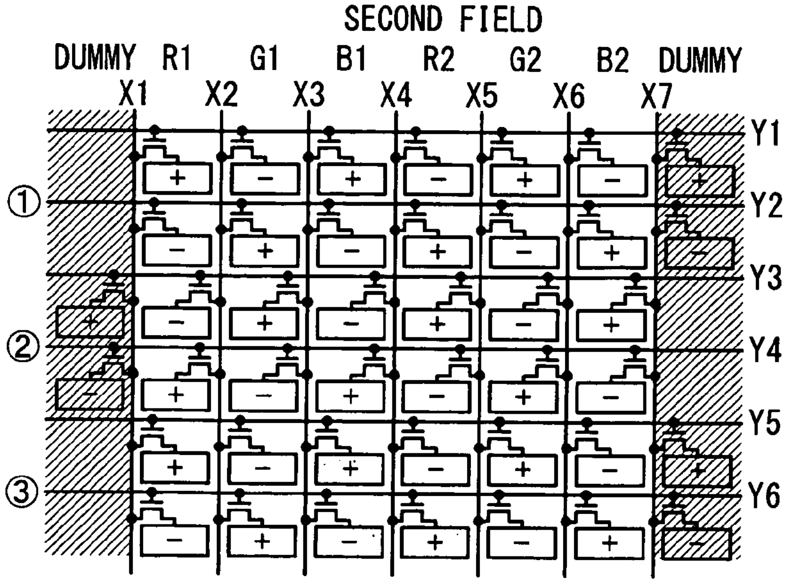
Figure 13C:
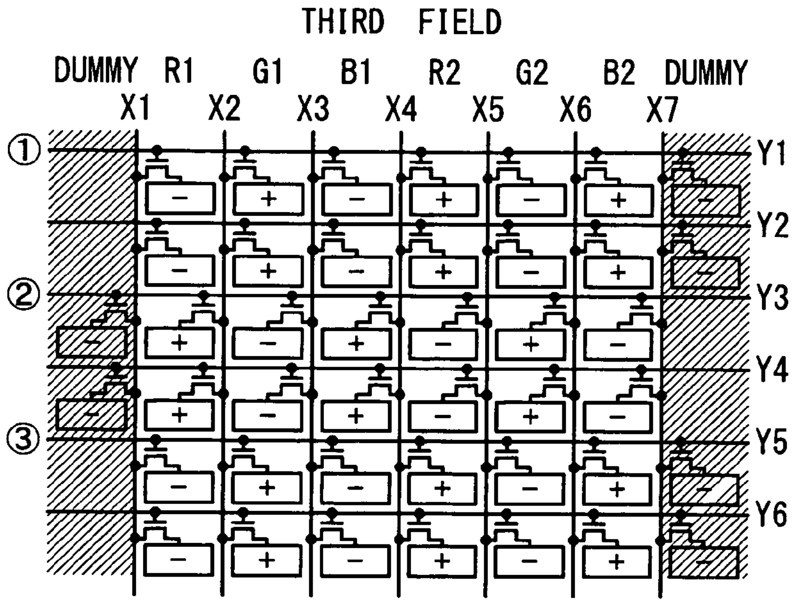
Figure 13D:
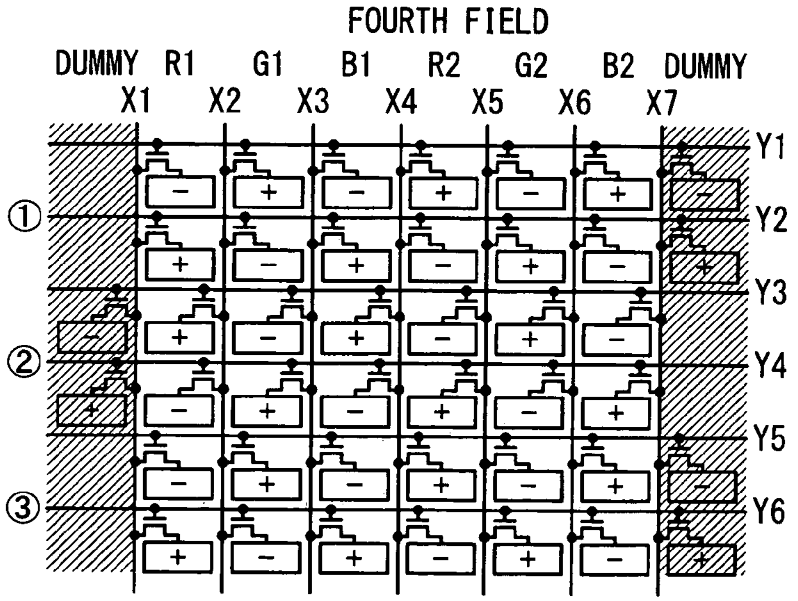
Figure 14A:
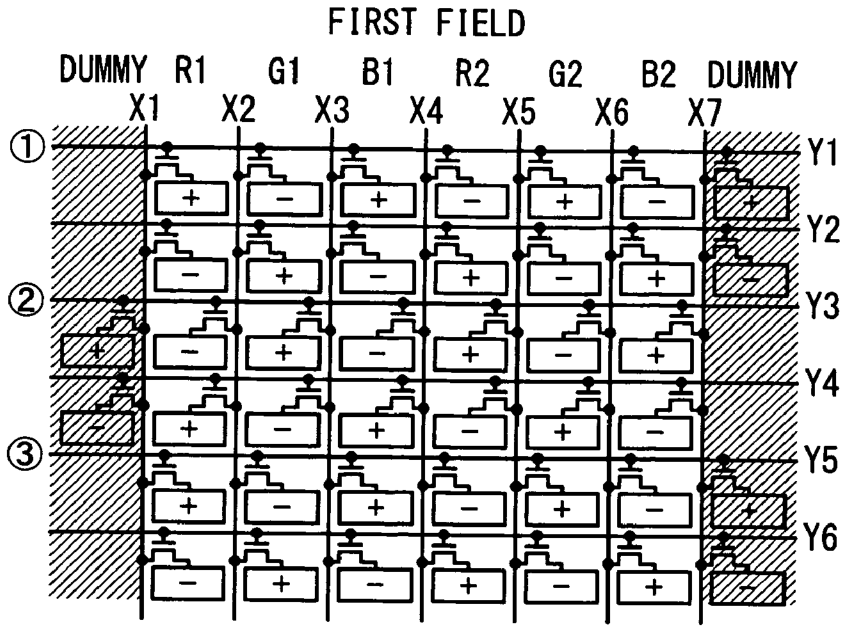
FIGS. 14A to 14D are diagrams showing a distribution of voltage polarities of pixel electrodes of the television set in the second embodiment of the present invention.
Figure 14B:
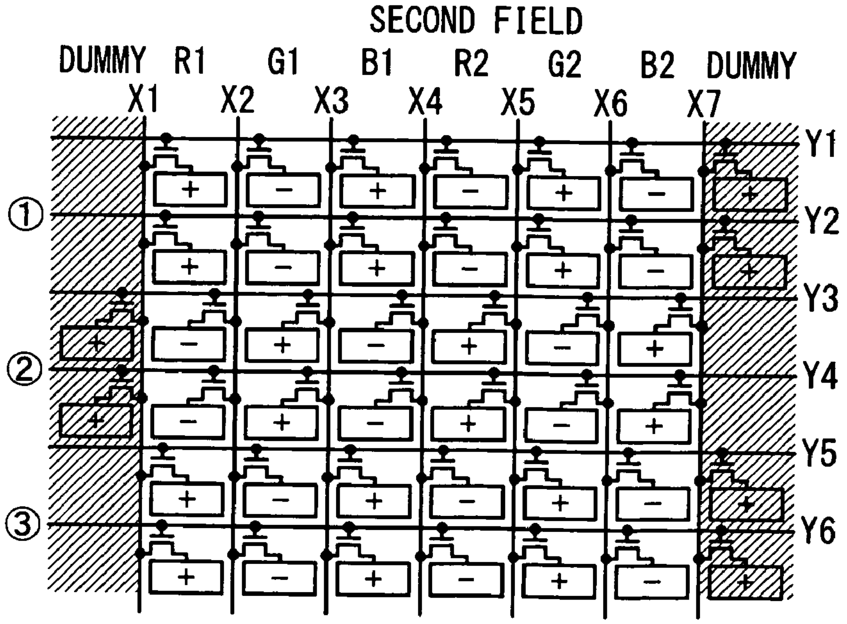
Figure 14C:
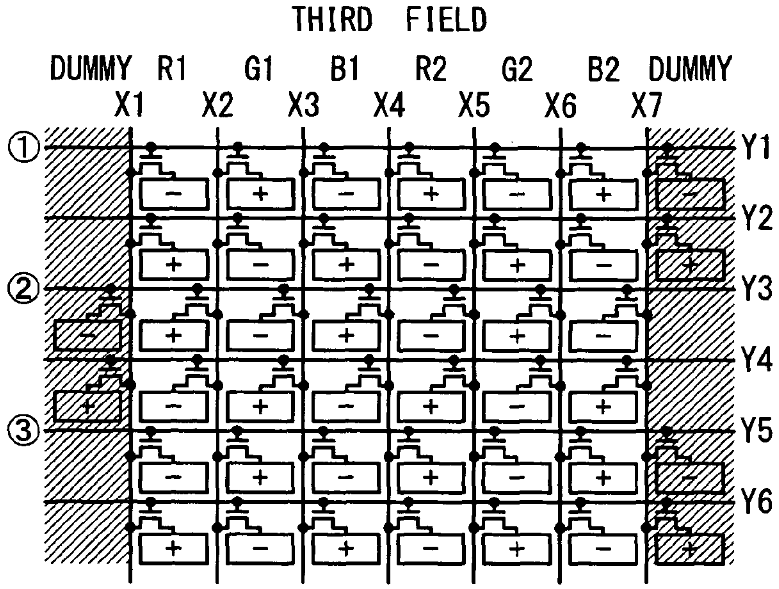
Figure 14D:
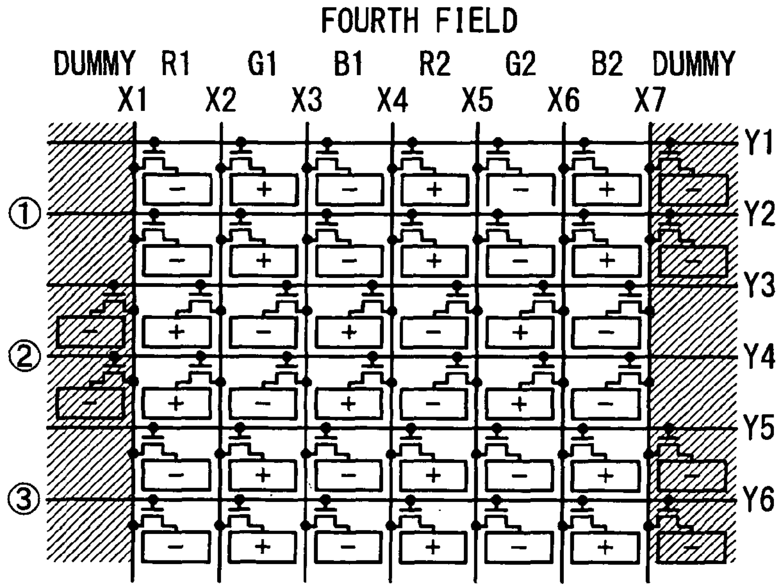

FIG. 12 shows a block diagram of the data line driving circuit 12 in the liquid crystal display unit 10. The data line driving circuit 12 contains a shift register circuit 51, a data latch circuit A 52, a data latch circuit B 53, a level shift circuit 54, a D/A converting circuit 55, a polarity switching circuit 56, a data buffer 57, a control circuit 58 and a grayscale voltage generating circuit 59. The data buffer 57 outputs the dot clock signal dCLK and the grayscale data Dx. The shift register circuit 51 shifts the grayscale data Dx from the data buffer 57 and outputs to the data latch circuit A 52. The data latch circuit A 52 latches the grayscale data Dx, and outputs the grayscale data Dx to the data latch circuit B 53 in response to the dot clock signal dCLK from the data buffer 57. The data latch circuit B 53 latches the grayscale data Dx. The control circuit 58 outputs the control signal Hsync and the polarity inversion signal POL. The data latch circuit B 53 outputs the grayscale data Dx to the level shift circuit 54 in response to the control signal Hsync from the control circuit 58. The level shift circuit 54 performs the level shift on the grayscale data Dx and outputs to the D/A converting circuit 55. The grayscale voltage generating circuit 59 generates a plurality of grayscale voltages corresponding to a plurality of grayscale data, respectively. The D/A converting circuit 55 outputs a grayscale voltage corresponding to the grayscale data Dx to the polarity converting circuit 56 in response to the control signal Hsync from the control circuit 58. The polarity switching circuit 56 outputs the grayscale voltage corresponding to the grayscale data as a display signal indicating the positive polarity "+" or the negative polarity "−", to an output terminal S in response to the polarity inversion signal POL from the control circuit 58 such that the polarities are different between the output terminals S (S1 to Sn+1) adjacent to each other. The data line driving circuit 12 is integrated on a semiconductor chip and provided on TCP (Tape Carrier Package) or COF (Chip on Film). The data lines on the liquid crystal panel 11 are connected through an anisotropic conductive film (ACF) to the leads of the TCP or COF. Or, this may be connected through ACF to bumps formed on the semiconductor chip (referred to as COG (Chip on Glass)).

The "still image clean mode" is equivalent to the driving system of PC. In the "moving image clean mode", the double speed drive is carried out to improve the motion blur. Since the drive frequency when the "moving image clean mode" is set is made higher than the drive frequency when the "still image clean mode" is set and the driving system is assumed to be a 1F inversion drive, low power consumption can be attained. As a result, since the temperature of the semiconductor chip can be decreased without any use of a heat sink, the parts cost can be made reduced. Also, the generation frequency of flicker can be reduced by arranging the pixels in the 2-stage zigzag arrangement even in the "normal mode".

Second Embodiment

The television set according to the second embodiment of the present invention will be described below. In the first embodiment, the scan line is subjected to the progressive drive. In this embodiment, in the "moving image clean mode", the scan line is subjected to the interlace drive, and the data line is subjected to the 1F (field) inversion drive. In this embodiment, the descriptions overlapping with the first embodiment are omitted, and the modes except the foregoing modes are equal to those of the first embodiment.

The polarity of the pixel in the "moving image clean mode" will be described below with reference to FIGS. 13A to 13D which are circulated. In the interlace drive, one frame is divided into an odd-numbered field in which odd-numbered scan lines (Y1, 3, 5) are driven; and an even-numbered field in which even-numbered scan lines (Y2, 4, 6) are driven.

In the first field, the odd-numbered scan lines are driven in an order from an upper portion to a lower portion. In this period, the data line driving circuit 12 outputs the display signal of the positive polarity "+" to the odd-numbered data lines X2$m$−1 and the display signal of the negative polarity "−" to the even-numbered data lines X2$m$. In the second field, the even-numbered scan lines are driven in the order from the upper portion to the lower portion. In this period, the data line driving circuit 12 supplies the display signal of the negative polarity "−" to the odd-numbered data lines X2$m$−1 and the display signal of the positive polarity "+" to the even-numbered data lines X2$m$. In the third field, the odd-numbered scan lines are driven in the order from the upper portion to the lower portion. In this period, the data line driving circuit 12 supplies the display signal of the negative polarity "−" to the odd-numbered data lines X2$m$−1 and the display signal of the positive polarity "+" to the even-numbered data lines X2$m$. In the fourth field, the even-numbered scan lines are driven in the order from the upper portion to the lower portion. In this period, the data line driving circuit 12 supplies the display signal of the positive polarity "+" to the odd-numbered data lines X2$m$−1 ad the display signal of the negative polarity "−" to the even-numbered data lines X2$m$.

The display signal supplied to the data lines is not inverted for each field. When it is shifted from the odd-numbered field to the even-numbered field, the polarity of the display signal is inverted. Or, as shown in FIGS. 14A to 14D which are circulated, when it is shifted from the even-numbered field to the odd-numbered field, the display signal may be inverted.

Third Embodiment

The television set according to a third embodiment of the present invention will be described below. In the first embodiment, the scan lines are subjected to the progressive drive. In this embodiment, in the "normal mode", the scan lines are subjected to the interlace drive, and the data lines are subjected to the 1F (field) inversion drive. In this embodiment, the descriptions overlapping with the first embodiment are omitted, and the modes except the foregoing modes are equal to those of the first embodiment.

The polarities of the pixels are equivalent to those of FIGS. 13A to 13D described in the second embodiment. Since the double speed drive is not used, the moving image quality is poor as compared with that of the "moving image clean mode".

A game machine can be connected to the input terminals 25 and 26 of the television set body 1. Although the video signal processing section 7 carries out a process for improving the image quality, the delay of about 1 second is usually generated. For example, the video signal processing section 7 carries out a frame interpolating process. Also, the converting process for the resolution and the like are carried out. It takes a time to carry out the processes for those video signals, and the reaction to a game operation is delayed. For this reason, a game mode function is known which skips the signal process in the video signal processing section 7 to improve the reaction speed. Also, in an old home game machine, the video signal existed in only one filed in the interlace scanning, and a black image is always displayed in the other one field, to reduce the capacity of the video memory. As the liquid crystal display apparatus, the image quality of the progressive drive is good. However, there is a case that a person who operates the game machine emphasizes the reaction speed more than the image quality. At that time, the interlace drive is preferred. The liquid crystal drive mode may be automatically switched to the "normal mode" (Interlace Drive) by turning on the game mode function. The video signal processing section 7 outputs a signal for switching the drive system of the scan line to the display controller 14, although this is not shown.

Fourth Embodiment

The television set according to a fourth embodiment of the present invention will be described below. In the first embodiment, the scan lines are subjected to the progressive drive. In this embodiment, in the "moving image clean mode" and the "normal mode", the scan lines are subjected to the interlace drive, and the data lines are subjected to the 1F (field) inversion drive. In this embodiment, the descriptions overlapping with the first embodiment are omitted, and the modes except the foregoing modes are equal to those of the first embodiment.

The polarity of the pixel is equivalent to that of FIGS. 13A to 13D described in the second embodiment. Similarly to the third embodiment, the double speed drive is not used in the "normal mode". Thus, the vertical crosstalk is likely to be generated. Therefore, the image quality is poor as compared with that of the "moving image clean mode".

As mentioned above, the first to fourth embodiments have been described. The output terminal of the television set has not been described in particular. However, the television set in the first to fourth embodiments may have the output terminal, and they may be connected to the input terminal of the DVD recorder or the like.

Also, the liquid crystal has been described as the normal black liquid crystal in which the transmittance is the lowest (black) in the non-application case. However, the liquid crystal may be a normal white liquid crystal in which the transmittance is the highest (white) in the non-application case.

Also, the arrangement of the pixels has been designed as the 2-stage zigzag type. However, this may be designed as a 1-stage zigzag type. This may be the normal pixel arrangement and not the zigzag type.

In the normal pixel arrangement, in the "moving image clean mode", a frame frequency when the "moving image clean mode" is set is made higher than a frame frequency when the "still image clean mode" is set, and the column inversion display is carried out in the 1F inversion drive. In the "still image clean mode", the frame frequency when the "still image clean mode" is set is made lower than the frame frequency when the "moving image clean mode" is set, and the 1H inversion display is carried out in the 1H inversion drive. In the normal pixel arrangement, the flicker is likely to be recognized at the time of the vertical stripe pattern in the "normal mode" in which the frame frequency is low.

In the 1-stage zigzag arrangement, in the "moving image clean mode", the frame frequency when the "moving image clean mode" is set is made higher than the frame frequency when the "still image clean mode" is set, and the 1H dot inversion display is carried out in a pseudo manner in the 1F inversion drive. In the "still image clean mode", the frame frequency when the "still image clean mode" is set is made lower than the frame frequency when the "moving image clean mode" is set, and the 2H dot inversion display is carried out in the pseudo manner in the 2H inversion drive. In the 2H inversion drive, the horizontal pattern irregularity is likely to be generated. Thus, when the number of scan lines is small, the 1-stage zigzag arrangement may be used. The reason why the 1H inversion drive is not used is in that when the frame frequency is slow, the flicker is likely to be generated at the time of the vertical stripe pattern because of the pseudo column inversion display.

Although the present invention has been described above in connection with several embodiments thereof, it would be apparent to those skilled in the art that those embodiments are provided solely for illustrating the present invention, and should not be relied upon to construe the appended claims in a limiting sense.

What is claimed is:

1. A television set comprising:

a television set body section which has a display panel in which pixels are arranged at intersections of scan lines and data lines in a matrix; and first and second input terminals provided for said television set body section, wherein a first video signal is displayed on said display panel in a first drive system, when the first video signal supplied to said first input terminal is selected, wherein a second video signal is displayed on said display panel in a second drive system, when the second video signal supplied to said second input terminal is selected, wherein said television set body section scans said scan lines in order in the first drive system and inverts a polarity of a display signal supplied to said data lines as the first video signal for every horizontal synchronization period and for every frame period, and wherein said television set body section scans said scan lines in order in the second drive system and inverts a polarity of a display signal supplied to said data lines as the second video signal for every frame period.

2. The television set according to claim 1, wherein said television set body section interlace-scans said scan lines in the second drive system and inverts the polarity of the display signal supplied to said data lines as the second video signal, when a field is changed from an odd-numbered field to an even-numbered field.

3. The television set according to claim 1, wherein said television set body section interlace-scans said scan lines in the second drive system and inverts the polarity of the display signal supplied to said data lines as the second video signal, when a field is changed from an even-numbered field to an odd-numbered field.

4. The television set according to claim 1, wherein a drive frequency of the second drive system is higher than a drive frequency of the first drive system.

5. The television set according to claim 1, wherein the first video signal is supplied from a personal computer.

6. The television set according to claim 1, wherein the first video signal is supplied from a recording apparatus, and comprises a still image.

7. The television set according to claim 1, wherein the first video signal comprises a digital video signal, wherein, when a copy control signal is added to said digital video signal to indicate a limitation of a number of times of a copy, said television set body section displays said digital video signal on said display panel in the second drive system, and wherein, when the copy control signal is not added to said digital video signal, the television set body section displays said digital video signal on said display panel in the first drive system.

8. The television set according to claim 1, wherein the second video signal comprises a television set broadcasting signal.

9. The television set according to claim 1, wherein the second video signal is supplied from a recording apparatus, and comprises a moving image.

10. The television set according to claim 8, further comprising:

an operation section configured to be operated by a user, wherein, when a temporary stop signal is inputted from said operation section to temporarily stop the display of the second video signal on said display panel, said television set body section switches from the second drive system to the first drive system to display the second video signal in the first drive system, and wherein, when a release signal is inputted from said operation section to release the temporary stop signal, the television set body section switches from the first drive system to the second drive system to display the second video signal in the second drive system.

11. The television set according to claim 1, wherein said pixels are alternately connected for every one or two data lines to the data lines adjacent to each other in said display panel.

12. The television set according to claim 1, wherein a pixel of said pixels comprises:

a TFT element;

a pixel electrode; and a common electrode opposite to said pixel electrode, and wherein a fixed voltage is supplied to said common electrode, and a polarity of a display signal supplied to the adjacent data lines are different from each other.

13. A method of displaying a display signal on a display panel in a television set, the method comprising:

displaying a first video signal as the display signal on said display panel using a first drive system, when the first video signal supplied to a first input terminal is selected; and displaying a second video signal as the display signal on said display panel using a second drive system, when the second video signal supplied to a second input terminal is selected, wherein said display panel comprises pixels arranged at intersections of scan lines and data lines, wherein said displaying the first video signal comprises:

scanning said scan lines in order, in the first drive system; and inverting a polarity of the display signal supplied to said data lines as the first video signal for every horizontal synchronization period and for every frame period, and wherein said displaying the second video signal comprises:

scanning said scan lines in order, in the second drive system; and inverting a polarity of the display signal supplied to said data lines as the second video signal for every frame period.

14. The method according to claim 13, further comprising:

interlace-scanning scan lines, of the display panel, in the second drive system; and inverting the polarity of the display signal supplied to data lines of the display panel as the second video signal, when a field is changed from an odd-numbered field to an even-numbered field.

15. The method according to claim 13, further comprising:

interlace-scanning scan lines, of the display panel, in the second drive system; and inverting the polarity of the display signal supplied to data lines of the display panel as the second video signal, when a field is changed from an even-numbered field to an odd-numbered field.

16. The method according to claim 13, wherein a drive frequency of the second drive system is higher than a drive frequency of the first drive system.

17. The television set according to claim 1, wherein the first drive system is pre-selected to drive the first video signal supplied to the first input terminal.

18. The television set according to claim 17, wherein, when the first drive system is de-selected from driving the first video signal, the second drive system is selected to drive the first video signal.

19. The television set according to claim 1, wherein the data lines are driven in a 1F inversion drive and the scan lines are driven using to an interlace drive.

20. The television set according to claim 1, wherein the drive lines are driven using a 1F inversion drive in a first display mode and the drive lines are driven using a 1H inversion drive in a second display mode.

* * * * *